United States Patent [19]

Fukuzawa et al.

[11] Patent Number: 4,860,990
[45] Date of Patent: Aug. 29, 1989

[54] DIAPHRAGM TYPE WATER INLET VALVE

[75] Inventors: Sooichi Fukuzawa; Yoshiaki Takeda, both of Hitachi; Yoshio Ohwa, Ibaraki, all of Japan

[73] Assignee: Hitachi, Ltd., Tokyo, Japan

[21] Appl. No.: 269,073

[22] Filed: Nov. 9, 1988

[30] Foreign Application Priority Data

Nov. 18, 1987 [JP] Japan .................. 62-289352
Feb. 24, 1988 [JP] Japan .................. 63-39420
Feb. 24, 1988 [JP] Japan .................. 63-39421
Jun. 24, 1988 [JP] Japan .................. 63-154756

[51] Int. Cl.$^4$ ............................................ F16K 31/02
[52] U.S. Cl. .................. 251/30.03; 138/42; 251/30.05; 251/45; 251/126
[58] Field of Search ........... 251/30.02, 30.03, 30.04, 251/30.05, 45, 46, 38, 126; 138/42

[56] References Cited

U.S. PATENT DOCUMENTS

| | | | |
|---|---|---|---|
| 1,539,435 | 5/1925 | Schutz | 251/126 |
| 2,142,893 | 1/1939 | Geyer | 251/126 |
| 3,439,895 | 4/1969 | Marandi | 251/45 |
| 3,593,956 | 7/1971 | McCarty, Jr. | 251/30.03 |
| 3,593,957 | 7/1971 | Dolter et al. | 251/30.03 |
| 3,672,627 | 6/1972 | McCarty, Jr. et al. | 251/30.03 |
| 3,872,878 | 3/1975 | Kozel et al. | 251/30.03 |
| 3,890,656 | 6/1975 | Mathis | 138/42 |

FOREIGN PATENT DOCUMENTS

| | | | |
|---|---|---|---|
| 0012118 | 6/1980 | European Pat. Off. | 251/30.03 |
| 0723285 | 3/1980 | U.S.S.R. | 138/42 |
| 1207329 | 9/1970 | United Kingdom | 251/30.03 |

*Primary Examiner*—George L. Walton
*Attorney, Agent, or Firm*—Antonelli, Terry & Wands

[57] ABSTRACT

A volute chamber having an inflow port is provided at the inlet of an extraction hole of a diaphragm valve. The volute chamber is formed with a lid in a hollow portion of a synthetic resin material member of the diaphragm member. The volute chamber is formed with a cap as volute chamber forming piece at the lower portion of the synthetic resin material member. A small projection is formed at the inlet of the extraction hole and protrudes in the volute chamber. A rib having an inflow port is formed partially at the outer surface of the cap. The spinning speed of the water in the volute chamber and the fluid circulation resistance in the volute chamber become large. The water supply to a back pressure chamber reduces and the closing speed of the diaphragm valve decreases. The water hammering action in the water inlet valve can be mitigated due to the rapid closing operation of the diaphragm valve.

14 Claims, 4 Drawing Sheets

DIAPHRAGM TYPE WATER INLET VALVE

BACKGROUND OF THE INVENTION

The present invention relates to a diaphragm type water inlet valve and, more particularly, to a diaphragm type water inlet valve suitable for use in an automatic electric washing machine.

The present invention relates to a pilot controlled pressure operated diaphragm type water inlet valve which operates by a pressure controlled by a pilot valve and, more particularly, to a pilot controlled pressure operated diaphragm type water inlet valve suitable for use in an automatic electric washing machine for mitigating a water hammering action.

It has conventionally been proposed to provide a pilot controlled pressure operated diaphragm type water inlet valve of the type which operates by a pressure controlled by a pilot valve provided by a plunger of an electro-magnetic solenoid.

A pilot controlled pressure operated diaphragm type water inlet valve described in, for example, U.S. Pat. No. 3,672,627, wherein the valve includes a diaphragm valve member adapted to be seated on an annular valve seat, an external peripheral bellows portion, and a central orifice which is opened and closed by a pilot valve. Additionally, a communicating extraction hole having a cross-sectional area which is smaller than that of the central orifice is formed in another member of the diaphragm valve member.

In order to prevent the cross-sectional areas of the central orifice and the communicating extraction hole from varying due to the deformation, corrosion or the like, a synthetic resin-made inserted element member is provided in a center of the diaphragm valve having the central orifice and the communicating extraction hole which is located at a position radially remote from the central orifice.

It has been proposed that at a downstream portion of the diaphragm valve, a guiding rib member and a columnar portion member, which is adapted to rapidly reduce the flow passage area of the water when the diaphragm valve opening is reduced, are provided. The movement of the diaphragm valve is guided by the guiding rib member and the columnar portion member during operation and the water hammering action is mitigated by decreasing the velocity of the water flow immediately before the diaphragm valve is fully opened.

The above described conventional pilot controlled pressure operated diaphragm type water inlet valve has a number of disadvantages such as, for example, an influence of the deformation resulting from a small gap between the guiding rib member and the inner periphery portion of the flow passage, and the clogging by the foreign matter in a gap between the columnar portion member and the inner periphery portion of the flow passage due to a rapid reduction in the flow passage area.

As a result, the conventional pilot controlled pressure operated diaphragm type water inlet valves occasionally malfunction have a complicated structure, and also have an inferior reliability.

SUMMARY OF THE INVENTION

An object of the present invention is to provide a diaphragm type water inlet valve wherein a water hammering action can be mitigated.

Another object of the present invention is to provide a diaphragm type water inlet valve wherein a closing time of the water inlet valve can be prolonged.

A further object of the present invention is to provide a diaphragm type water inlet valve wherein a large flow passage resistance to a make-up water which is to be supplied through a communicating extraction hole can be imparted therein.

A still further object of the present invention is to provide a diaphragm type water inlet valve wherein an increase in a volume of a back pressure chamber during a closing operation of a water inlet valve can be supplemented.

Yet another object of the present invention is to provide a diaphragm type water inlet valve wherein a continuous water inflow due to an entrance of a foreign matter can be prevented from arising.

A still further object of the present invention is to provide a diaphragm type water inlet valve wherein a check by a foreign matter at an inlet portion of a communicating extraction hole can be prevented.

In accordance with the present invention a diaphragm type water inlet comprises an assembly of a valve main body having an inlet, an outlet, and a cylindrical chamber which provides communication between the inlet and the outlet, an electric control means having an electro-magnetic solenoid, a plunger, a spring member, and a pilot valve, with the plunger being movable back against a pressure of the spring member when the electro-magnetic solenoid is energized. The pilot valve is provided at a tip end of the plunger and a diaphragm valve is opposed to a valve seat provided in the cylindrical chamber of the valve main body and held at its outer periphery, with the diaphragm valve having a flexible member, and a hole forming member. The flexible member is fixed at its end portion to the valve main body, with the hole forming member having a central orifice and a communicating extraction hole. A cross-sectional area of the central orifice is larger than that of the communicating extraction hole, and the central orifice is opened and closed by the pilot valve. The diaphragm valve is arranged to form, at its back side, a back pressure chamber separated from a flow passage of a fluid and to move upward and downward under a control of the pilot valve in the back pressure chamber. The communicating extraction hole provides communication between the flow passage and the back pressure chamber, and the diaphragm valve is seated on the valve seat to shut off a flow of the fluid when the diaphragm valve reaches its the lower position.

A volute chamber is provided at an inlet portion of the communicating extraction hole of the diaphragm valve, water is made to flow into the volute chamber in a circumferential direction thereof, and the communicating extraction hole is positioned in the vicinity of a center of the volute chamber.

The volute chamber is formed with the lid member in a hollow form on the hole forming member of the diaphragm valve at the inlet end portion of the communicating extraction hole of the diaphragm valve and the inflow port of the volute chamber is formed at the side wall portion of the hole forming member of the diaphragm valve.

The volute chamber is formed covering the lower portion of the hole forming member of the diaphragm valve with the volute chamber forming member at the inlet portion of the communicating extraction hole.

When the pilot valve is placed its open state, a part of pressure water in the flow passage flows into the volute chamber, from the circumferential direction thereof, which is provided at the inlet portion of the communicating extraction hole communicating with the back pressure chamber.

The water moves spirally in the volute chamber and passes through the communicating extraction hole opened in the center of the volute chamber while being subjected to a large flow passage resistance. With a reduced water velocity head, the water flows into the back pressure chamber, and further flows through the central orifice and the communication hole of the diaphragm valve toward a downstream side flow passage.

At this time, the pressure in the back pressure chamber reaches a value nearly to a pressure in a discharge port side which is smaller than that in the flow passage, since the fluid circulation resistance of the water in the central orifice is extremely small compared with that of the water in the inflow passage portion because the flow passage of the central orifice has an increased cross-sectional area.

Thus, the diaphragm valve is pushed up and held in its open state. Accordingly, the water passes through the gap between the diaphragm valve and the annular valve seat and then is discharged from the downstream discharge port.

When the pilot valve is placed in a closed state, the flow of the water from the central orifice is stopped and the pressure water passing through the communicating extraction hole immediately increases the pressure in the back pressure chamber. Thus, the diaphragm valve is pushed downwardly by the difference in pressure receiving area between the upstream flow passage side and the downstream flow passage side of the diaphragm valve, and starts its closing operation.

At this time, as the diaphragm valve descends, the volume of the back pressure chamber increases, and the amount of water according to the increment is supplied from the upstream flow passage side. However, since the diaphragm valve descends in a short of time, the flow velocity of the water at the inflow portion in the water inlet valve becomes large.

The spinning speed of the water in the volute chamber increases and the fluid circulation resistance in the volute chamber becomes extremely large. The fluid circulation resistance coefficient in this water inlet valve construction becomes several ten times that of the mere communicating extraction hole without such a volute chamber in the conventional pilot controlled pressure operated diaphragm type water inlet valve.

Accordingly, the water supply to the back pressure chamber reduces and the closing speed of the diaphragm valve naturally decreases, so that a rapid closing operation of the diaphragm valve is prevented and the water hammering action in the water inlet valve can be greated mitigated.

According to the present invention, the positive closing operation of the diaphragm valve is assured and the closing speed thereof can be reduced by a construction in which the water is spirally moved in the volute chamber provided at the inlet portion of the communicating extraction hole. Thus, it is possible to greatly mitigate the water hammering action in the water inlet valve due to the rapid closing operation of the diaphragm valve.

A small cylindrical projection member is formed at the inlet portion of the hole forming member of the diaphragm valve and protrudes in the volute chamber. A gap between the tip of the small cylindrical projection member and the inner surface bottom portion of the volute chamber is made smaller than the diameter of the inflow port of the volute chamber.

According to the provision of the small cylindrical projection member, and the gap between the tip of the small cylindrical projection of the volute chamber and the inner surface bottom portion of the volute chamber, the foreign matter entering from the inflow port of the volute chamber can be trapped by the gap, thus by several times the entrance by the foreign matter can be prevented.

A rib member having the inflow port therein is formed at the part of the outer peripheral surface of the volute chamber. By virtue of the provision of the rib member, the water by way of entering from the inflow port of the volute chamber collides against the rib member; therefore, the foreign matter around the rib member is made separate remotely at all times from the inflow port of the volute chamber and the checking the entrance by the foreign matter into the inflow port of the volute chamber can be prevented.

Figure 1:
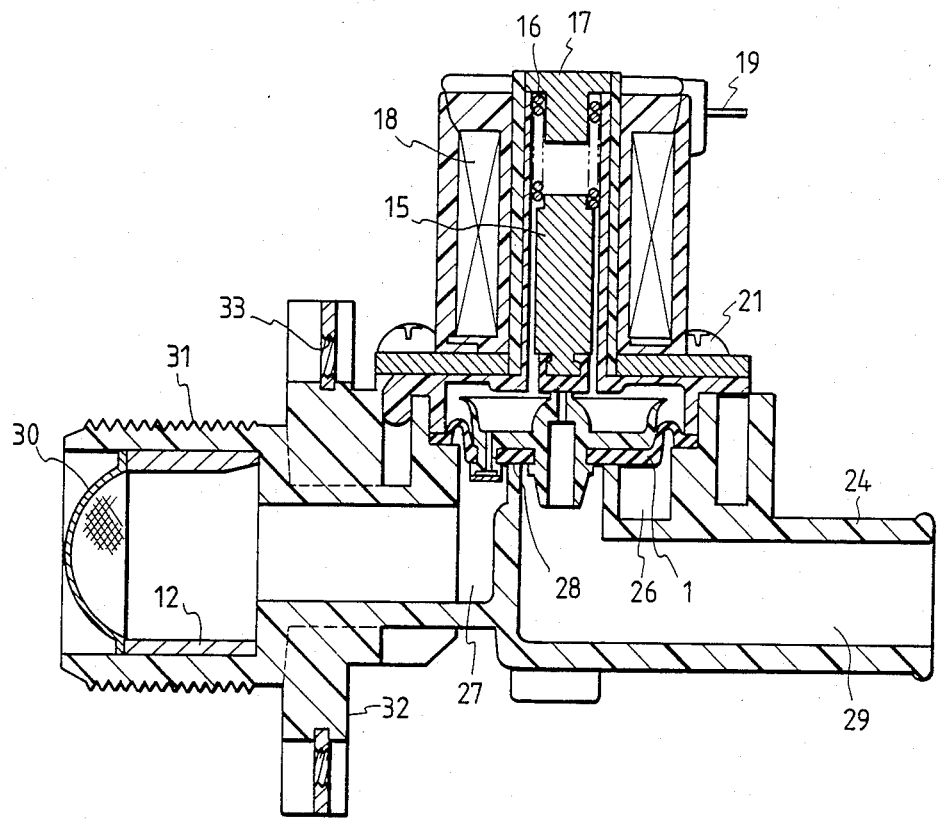
FIG. 1 is a vertical cross-sectional view of a diaphragm type water inlet valve according to one embodiment of the present invention.
Figure 2:
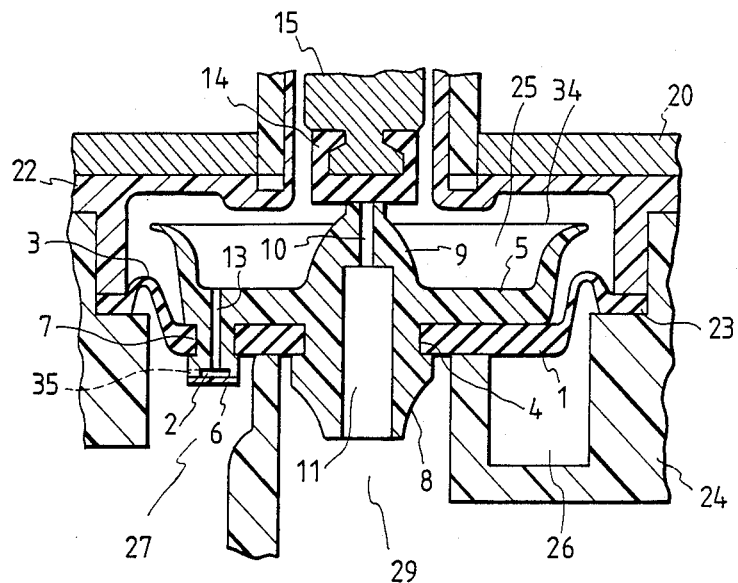
FIG. 2 is an enlarged cross-sectional view of a diaphragm valve portion shown in FIG. 1.

DESCRIPTION OF THE INVENTION:

Referring now to the drawings wherein like reference numeral are used throughout the various views to designate like parts and, more particularly, to FIGS. 1 and 2, according to these figures, a diaphragm valve 1 of a diaphragm type water inlet valve is made of a resilient member such as rubber and a synthetic resin material member. The diaphragm valve 1 is seated on an annular valve seat 28 so as to shut off the flow of water. The diaphragm valve 1 further includes clamping portions 4 and 7 for holding a flexible member 3 and a synthetic resin material member 5, and is fixed as its end portion 23 to a valve main body 24 of the water inlet valve by a part 22. The valve main body 24 has an inlet, an outlet, and a cylindrical chamber which provides communication between the inlet and the outlet.

The synthetic resin material member 5 is a member for hole forming member of the diaphragm valve 1 and has a central orifice 10, a communication hole 11, and a communicating exraction hole or pressure extraction hole 13 which provides communication between a back pressure chamber 25 and an upstream side flow passage 27.

Figure 3:
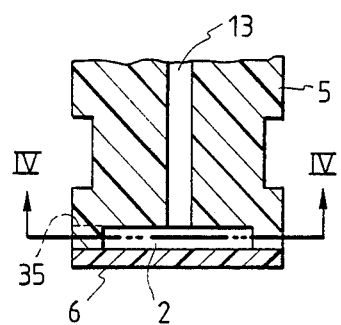
FIG. 3 is a vertical cross-sectional view of another embodiment of the present invention and primarily illustrates a diaphragm valve portion.
Figure 4:
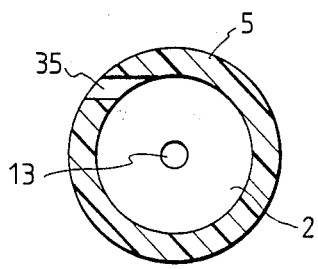
FIG. 4 is a cross-sectional view taken along line IV—IV of FIG. 3.

At the inlet end of the communicating extraction hole 13, a volute chamber 2 having an inflow port 35 is formed by the synthetic resin material member 5 and a lid member 6 is provided as shown in detail in FIG. 3.

The volute chamber 2 is formed integrally in a hollow form at a bottom portion of the synthetic resin material member 5. The lid member 6 is made of a synthetic resin material member and is attached to the outer peripheral bottom portion of the synthetic resin material member 5 and forms the volute chamber 2 surrounding the hollow bottom portion of the synthetic resin material member 5.

The inflow port 35 is provided so as to contact to an inner peripheral surface of the volute chamber 2. The diameter of the inflow port 35 of the volute chamber 2 is substantially equal to a height of the volute chamber 2. The water flows in the volute chamber 2 in a circumferential direction thereof.

Additionally, in the water inlet valve a lower projection portion 8 and an upper projection portion 9 of the synthetic resin material member 5 of the diaphragm valve 1 have the communication hole 11 and the central orifice 10, respectively. A stopper 34 is provided for restricting the amount of movement of the diaphragm valve 1 at the upper portion of the synthetic resin material member 5 in the fully open state thereof.

A pilot valve 14 is provided at the tip end of a plunger 15 of an electro-magnetic solenoid 18. When the electro-magnetic solenoid 18 is energized, the plunger 15 moves upwardly against the pressure of a spring member 16 to open the opening of the central orifice 10. On the other hand, when the electro-magnetic solenoid 18 is deenergized, the plunger 15 is moved downwardly by the pressure of the spring member 16 to close the opening of the central orifice 10.

A member 17 functions both as a lid function and a stopper for the spring member 16. A lead wire 19, a pressure fittings metal 20, screws 21 for fixing the part 22 and the pressure fittings metal 20 to the valve main body 24, and a common middle side flow passage 26 which communicates with the upstream side flow passage 27, which is arranged at the upstream side of the diaphragm valve 1, are provided on the water inlet valve.

A downstream side flow passage 29, arranged at the downstream side of the diaphragm valve 1, communicates with a discharge port (not shown). A strainer 30 serves to inhibit function for the entrance of the dirt, the foreign matter or the like.

A connecting threaded portion 31 is formed for connection with the city water pipe or the like. A flanged portion 32 adapted to be mounted to a panel or the like, threaded portions 33 for fixing a panel or the like to the flanged portion 32, and a spacer 12 for holding the strainer 30 are provided in the water inlet valve.

In the above described arrangement, when the electro-magnetic solenoid 18 is energized through the lead wire 19, the plunger 15 is attracted upwardly to compress the spring member 16 and the pilot valve 14 provided at the tip end of the plunger 15 opens the opening of the central orifice 10.

Thus, the pressure water enters into the volute chamber 2 through the inflow port 35 which is opened at the upstream side flow passage 27 of the water inlet valve, and then flows spirally around the side inner wall of the volute chamber 2 while being subjected to a large fluid circulation resistance.

The water, reduced in pressure in the volute chamber 2 flows into the back pressure chamber 25 through the communicating extraction hole 13 which is opened in the vicinity of the center including the center of the volute chamber 2.

Since the central orifice 10 and the communication hole 11, both of which have a cross-sectional area larger than that of the communicating extraction hole 13, are opened in the downstream side flow passage 29, the water which has flown into the back pressure chamber 25 immediately flows into the downstream side flow passage 29 of the water inlet valve.

Thus, the pressure in the back pressure chamber 25 is reduced to a level which is much lower than the those of in the upstream side flow passage 27 and the common middle side flow passage 26. The resulting pressure difference at the diaphragm valve 1 causes the diaphragm valve 1 to move away from the annular valve seat 28 in the upward direction, thereby providing communication between the upstream side flow passage 27 and the common middle side flow passage 26 and the downstream side flow passage 29 of the water inlet valve.

Thus, the water inlet valve is placed in its open state and the water is allowed to move from the upstream side flow passage 27 and the common middle side flow passage 26 to the downstream side flow passage 29.

When the electro-magnetic solenoid 18 is de-energized, the plunger 15 is moved downwardly by the recovery force of the spring member 16 so as to cause the pilot valve 14 to close the opening of the central orifice 10. Thus, the pressure in the back pressure chamber 25 is instantaneously made equal to the pressure in each of the upstream side flow passage 27 and the common middle side flow passage 26.

At this time, since the central portion of the lower side of the diaphragm valve 1 (the portion which faces the space inside the annular valve seat 28) faces a low pressure area which communicates with the discharge port, the diaphragm valve 1 immediately starts its closing operation by the difference pressure due to the difference in pressure receiving area of the diaphragm valve 1.

In this case, if the diaphragm valve 1 reaches its fully closed state in a short time, a large water hammering action will occur. However, in this embodiment of the present invention, the make-up water passes through the inflow port 35 and flows into the volute chamber 2 in the circumferential direction thereof in an amount according to an increase in the volume of the back pressure chamber 25 due to the movement of the diaphragm valve 1 in the valve-closing direction.

After the water has spun in the volute chamber 2, the water flows into the communicating extraction hole 13 formed in the vicinity of the center of the volute chamber 2. At this time, the water is subjected to extremely large fluid circulation resistance.

Thus, the make-up water becomes unable to follow the closing operation of the diaphragm valve 1, and the pressure in the back pressure chamber 25 is reduced. As a result, the speed of the closing operation of the diaphragm valve 1 becomes small so that the water hammering action in the water inlet valve can be mitigated.

Figure 5:
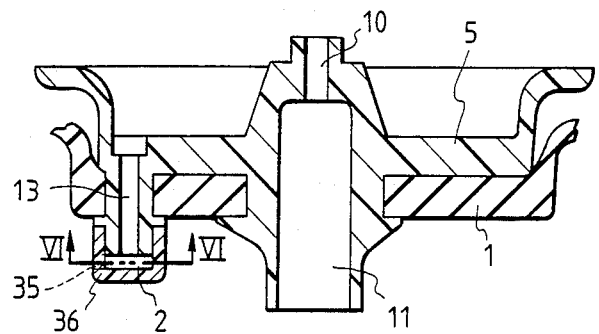
FIG. 5 is a vertical cross-sectional view of another embodiment of the present invention and primarily illustrates a diaphragm valve portion.
Figure 6:
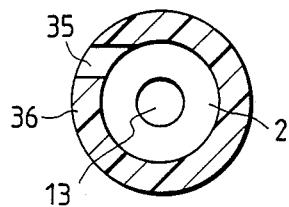
FIG. 6 is a cross-sectional view taken along line VI—VI of FIG. 5.

In FIGS. 5 and 6, a volute chamber forming piece or member 36 is a piece of a member for forming the volute chamber 2 therein and is a cap having a cylindrical side wall portion and a circular bottom wall portion. The volute chamber forming piece 36 is formed as a separate piece from the synthetic resin material member 5 of the diaphragm valve 1.

The volute chamber forming piece 36 is made of a synthetic resin material and is attached to an outer wall peripheral cylindrical portion of the synthetic resin material member 5 of the diaphragm valve 1. The volute chamber forming piece 36 has an inflow port or opening 35 at the cylindrical side wall portion thereof. The inflow port 35 of the volute chamber forming piece 36 is provided so as to contact to an inner peripheral surface of the volute chamber 2. The diameter of the inflow port 35 of the volute chamber 2 is substantially a height of the height of the volute chamber 2. The communicating extraction hole 13 is positioned in a center of the volute chamber 2.

Figure 7:
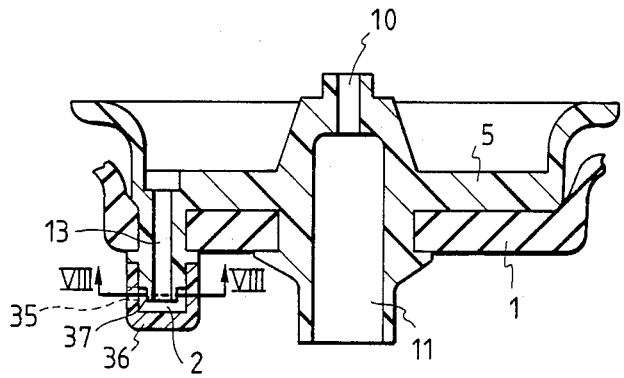
FIG. 7 is a vertical cross-sectional view of still another embodiment of the present invention and primarily illustrates a diaphragm valve portion.
Figure 8:
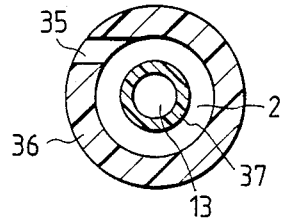
FIG. 8 is a cross-sectional view taken along line VIII—VIII of FIG. 7.

The embodiment shown in FIGS. 7 and 8 differs from that shown in FIGS. 5 and 6 that a small cylindrical projection member 37 protrudes in the volute chamber 2. The small cylindrical projection member 37 is formed integrally with the synthetic resin material member 5 of the diaphragm valve 1. The tip of the small cylindrical projection member 37 extends downwardly below an upper end portion of the inflow port 35 of the volute chamber forming piece 36. The communicating extraction hole 13 is positioned at a center of the small cylindrical projection member 37 of the synthetic resin material member 5.

It is to be noted that, in each of the above described embodiments, the cross-sectional shape of the inflow port or opening 35 of the volute chamber 2 is not limited to a round form and, for example, a rectangular form or an oval form may be used.

In accordance with the above stated embodiments of the present invention, the positive closing operation of the diaphragm valve 1 is assured and the closing speed of the diaphragm valve 1 can be reduced by a simple construction in which the water is spirally moved in the volute chamber 2 arranged at the inlet portion of the communicating extraction hole 13. Thus, it is possible to greatly mitigate the water hammering action in the water inlet valve due to the rapid closing operation of the diaphragm valve 1.

Also, the combination of the volute chamber 2 and the communicating extraction hole 13, although the fluid resistance coefficient of the water becomes extremely large, enables enlargement of the diameter of the communicating extraction hole 13 or the like, whereby the problem of the clogging by dirt can be solved.

Figure 9:
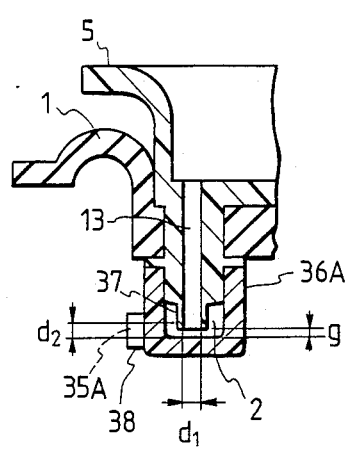
FIG. 9 is a vertical cross-sectional view of a further embodiment of the present invention and primarily illustrates a volute chamber forming piece.
Figure 10:
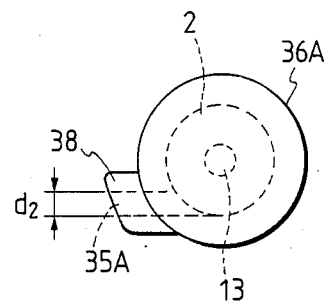
FIG. 10 is a view showing a volute chamber forming piece having a rib member.

In FIGS. 9 and 10, a volute chamber forming piece or member 36A has a rib member 38 and an inflow port or opening 35A. The volute chamber forming piece 36A forms the volute chamber 2 at a lower end portion of the communicating extraction hole 13 and a surrounding outer wall portion of the small cylindrical projection member 37 of the synthetic resin material member 5.

The inflow port 35A is provided through an inner portion of the rib member 38 and a part of the cylindrical side wall of the volute chamber forming piece 36A. The rib member 38 is provided integrally to and projected from an outer peripheral wall of the volute chamber forming piece 36A.

The inflow port 35A is provided so as to contact an inner peripheral surface of the volute chamber 2. The water is made to flow the volute chamber 2 in a circumferential direction thereof. The communicating extraction hole 13 and the inflow port 35A communicate through the volute chamber 2.

The diameter ($d_1$) of the communicating extraction hole 13 is made larger than the diameter ($d_2$) of the inflow port 35A of the volute chamber 2. A gap (g) between a tip of the small cylindrical cylindrical projection member 37, which is provided integrally with the synthetic resin material member 5, and an inner surface bottom portion of the volute chamber forming piece 36A is made smaller than the diameter ($d_2$) of the inflow port 35A of the volute chamber 2.

By the provision of the rib member 38, which is projected partially at the outer cylindrical surface of the volute chamber forming piece 36A, the water, by way of entering from the inflow port 35A, collides against the rib member 38. The disturbance is caused at the surrounding portion of the rib member 38 and the foreign matter turning and floating around the rib member 38 is remotely separate at all times from the inlet portion of the inflow port 35A and is prevented from blocking the entrance of the foreign matter into the inflow port 35A.

As a result, the foreign matter does not enter into the volute chamber 2 in the volute chamber forming piece 36A through the inflow port 35A, thus the main cause for blocking the communicating extraction hole 13 of the synthetic resin material member 5 disappears.

Further, by virtue of the provision of the rib member 38 having the inflow passage therein, the leading length of the inflow port 35A is increased; therefore, the water straightening at the inflow condition is practised at the lengthened inflow port 35A and is introduced smoothly into the volute chamber 2 in the volute chamber forming piece 36A. The water speed spinning in the volute chamber 2 is increased further and the velocity of the water at the center portion of the vortex can be restrained further, thus an effect for the water hammering action mitigation in the water inlet valve can be effectively increased.

The velocity of the water passing through the communicating extraction hole 13 can be restrained further, and also at time for filling up by water at the back pressure chamber 25 arranged at the upper portion of the diaphragm valve 1 can be lengthen and, as a result, the diaphragm valve 1 can descend slowly and gradually shut off the discharge port.

By virtue of the provision of the small cylindrical projection member 37 at the vicinity of the inlet portion of the communicating extraction hole 13 and the formation of the gap (g) between the lower surface of the small cylindrical projection member 37 and the inner surface of the volute chamber forming piece 36A which is made smaller than the diameter ($d_2$) of the inflow port 35A, even the foreign matter entering from the inflow port 35A can be trapped by the gap (g), thus by several times the entrance by the foreign matter can be prevented.

Figure 11:
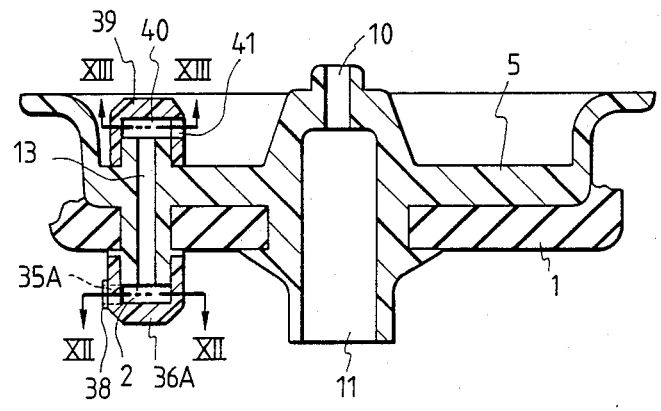
FIG. 11 is a vertical cross-sectional view of still another embodiment of the present invention and primarily illustrates a diaphragm valve portion.
Figure 12:
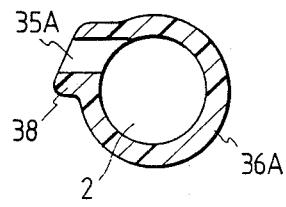
FIG. 12 is a cross-sectional view taken along line XII—XII of FIG. 11.
Figure 13:
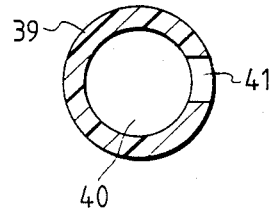
FIG. 13 is a cross-sectional view taken along line XIII—XIII of FIG. 11.

In FIGS. 11, 12 and 13, the synthetic resin material member 5 of the diaphragm valve 1 has the volute chamber forming piece 36A at the inlet portion of the communicating extraction holes 13 and also an outlet chamber forming piece 39 at the outlet portion of the communicating extraction hole 13, respectively.

The volute chamber 2 is formed by the volute chamber forming piece 36A having the inflow port 35A. The outlet chamber forming piece 39 is made of a synthetic resin material and has an outlet chamber 40 and an outlet port or opening 41. The outlet chamber forming piece 39 is attached to the outer cylindrical projection portion of the synthetic resin material member 5, namely, to the outlet portion of the communicating extraction hole 13.

When the pilot valve 14 is placed in an open state, a part of the pressure water in the upstream flow passage 27 flows into the volute chamber 2, from the circumferential diction thereof. The water moves spirally in the volute chamber 2 and flows out in the outlet chamber 40 through the communication extraction hole 13, and passes through the outlet port 41 of the outlet chamber forming piece 39 while being subjected to a large flow passage resistance.

Under such a condition with a reduced velocity head of the water, the water flows into the back pressure chamber 25 from the outlet port 41 of the outlet chamber 40, and further flows through the central orifice 10 and the communication hole 11 of the diaphragm valve 1 toward the downstream side flow passage 29.

At this time, the pressure in the back pressure chamber 25 reaches a value nearly equal to a value of a pressure in a discharge flow passage side which is smaller than in the inflow passage side, since the fluid circulation resistance of the water in the central orifice 10 is extremely small compared with that of water in the inflow portion at the communicating extraction hole 13, the outlet port 41 etc., because the flow passage of the central orifice 10 has an increased cross-sectional area than that of the flow passages of the communicating extraction hole 13 and the outlet port 41.

Since the central orifice 10 and the communication hole 11 are opened in the downstream side flow passage 29, the water immediately flows into the downstream side flow passage 29.

On the other hand, when the electro-magnetic solenoid 18 is de-energized, the plunger 15 is moved downwardly by the recovery force of the spring member 26 so as to cause the pilot valve 14 to close the opening of the central orifice 10.

The spinning speed of water in the volute chamber 2 increases and the fluid circulation resistance in the volute chamber 2 becomes extremely large. The water flows into the outlet chamber 40 through the communicating extraction hole 13 and the water which has been reduced in pressure into the back pressure chamber 25 from the outlet port 41 of the outlet chamber 40.

In the embodiment of FIGS. 11-13, the make-up water passes through the inlet port 35A and flows into the volute chamber 2 along the wall face thereof in an amount according to an increase in the volume of the back pressure chamber 25 due to the movement of the diaphragm valve 1 in the valve-closing direction.

After the water has spun in the volute chamber 2, the water flows into the outlet chamber 40 through the communicating extraction hole 13 and is further subjected to a fluid circulation resistance and flows out from the outlet port 41 of the outlet chamber 40. At this time, the water is subjected to extremely large fluid circulation resistance.

Thus, the make-up water through the inlet ports 35A, the volute chamber 2, the communicating extraction hole 13, the outlet chamber 40, and the outlet port 41 becomes unable to follow the closing operation of the diaphragm valve 1. As a result, the speed of the closing operation of the diaphragm valve 1 becomes small so that the water hammering action in the water inlet valve can be mitigated.

I claim:

1. A diaphragm type water inlet valve comprising an assembly of:

a valve main body having an inlet, an outlet, and a cylindrical chamber which provides communication between said inlet and said outlet;

an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;

a diaphragm valve opposed to a valve seat provided in said cylindrical chamber of said valve main body and held at its outer periphery, said diaphragm valve having a flexible member, and a hole forming member, said flexible member being fixed at its end portion to said valve main body, said hole forming member having a central orifice and a communicating extraction hole, a cross-sectional area of said central orifice being formed larger than a cross-sectional area of said communicating extraction hole, said central orifice being opened and closed by said pilot valve, said diaphragm valve being arranged to form, at a back side thereof, a back pressure chamber separated from a flow passage of a fluid to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches its the lowest position;

a volute chamber is provided so as to surround an inlet portion of said communicating extraction hole of said diaphragm valve, water is made to flow into said volute chamber in a circumferential direction thereof, said communicating extraction hole is positioned in a vicinity of a center of said volute chamber, and an axis of an inflow port of said volute chamber is orthogonal with an axis of said communicating extraction hole.

2. A diaphragm type water inlet valve according to claim 1, characterized in that said volute chamber is formed in a hollow form on said hole forming member of said diaphragm valve at an inlet end portion of said communicating extraction hole of said diaphragm valve, said inflow port of said volute chamber is formed at a side wall portion of said hole forming member of said diaphragm valve, and a lid member is fixed on a lower end portion of said hole forming member of said diaphragm valve.

3. A diaphragm type water inlet valve according to claim 1, a volute chamber forming member is provided at an inlet portion of said hole forming member of said diaphragm valve, said volute chamber is formed at a space between a lower portion of said hole forming member of said diaphragm valve and an inner surface portion of said volute chamber forming member, and inflow port for said volute chamber is formed at a side wall portion of said volute chamber forming member.

4. A diaphragm type water inlet valve according to claim 2, a diameter of said inflow port of said volute chamber is substantially to be a height of said volute chamber.

5. A diaphragm type water inlet valve according to claim 3, a diameter of said inflow port of said volute chamber is substantially to be a height of said volute chamber.

6. A diaphragm type water inlet valve comprising an assembly of:
  a valve main body having an inlet, an outlet, and a cylindrical chamber which provides communication between said inlet and said outlet;
  an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;
  a diaphragm valve opposed to a valve seat provided in said cylindrical chamber of said valve main body and held at an outer periphery thereof, said diaphragm valve having a flexible member, and a hole forming member, said flexible member being fixed at its end portion to said valve main body, said hole forming member having a central orifice and communicating extraction hole, a cross sectional area of said central orifice being formed larger than a cross sectional area of said communicating extraction hole, said central orifice being opened and closed by said pilot valve, said diaphragm valve being arranged to form, at a back side thereof, a back pressure chamber separated from a flow passage of a fluid and to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches its lowest position;
  a volute chamber is provided at an inlet of said communicating extraction hole of said diaphragm valve, water is made to flow into said volute chamber in a circumferential direction thereof, said communicating extraction hole is positioned in a vicinity of a center of said volute chamber;
  a volute chamber forming member is provided at an inlet portion of said hole forming member of said diaphragm valve, said volute chamber is formed at a space between a lower portion of said hole forming member of said diaphragm valve and an inner surface portion of said volute chamber forming member, and an inflow port for said volute chamber is formed at a sidewall portion of said volute chamber forming members; and
  a small cylindrical projection member surrounding an inlet portion of said communicating extraction hole of said diaphragm valve is formed at inlet portion of said hole forming member of said diaphragm valve and protrudes into said volute chamber for preventing an inflow of foreign matter into said volute chamber.

7. A diaphragm type water inlet valve according to claim 6, a gap for trapping foreign matter between a tip of said small cylindrical projection member of said hole forming member of said diaphragm valve and an inner surface bottom portion of said volute chamber forming member is made smaller than a diameter of said inflow port of said volute chamber forming member.

8. A diaphragm type water inlet valve according to claim 7, wherein a small cylindrical projection member for surrounding an inlet portion of said communicating extraction hole of said diaphragm valve is formed at an inlet portion of said hole forming member of said diaphragm valve and protrudes into said volute chamber for preventing an inflow of foreign matter into said volute chamber.

9. A diaphragm type water inlet valve according to claim 8, a gap for trapping foreign matter between a tip of said small cylindrical projection member of said hole forming member of said diaphragm valve and an inner surface bottom portion of said volute chamber forming member is made smaller than a diameter of said inflow port of said volute chamber forming member.

10. A diaphragm type water inlet valve comprising an assembly of:
  a valve main body having an inlet, an outlet, and a cylindrical chamber which provides communication between said inlet and said outlet;
  an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;
  a diaphragm valve opposed to a valve seat provided in said cylindrical chamber of said valve main body and held at an outer periphery thereof, said diaphragm valve having a flexible member, and a hole forming member, said flexible member being fixed at its end portion to said valve main body, said hole forming member having a central orifice and communicating extraction hole, a cross sectional area of said central orifice being formed larger than a cross sectional area of said communicating extraction hole, said central orifice being opened and closed by said pilot valve, said diaphragm valve being arranged to form, at a back side thereof, a back pressure chamber separated from a flow passage of a fluid and to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches its lowest position;
  a volute chamber is provided at an inlet of said communicating extraction hole of said diaphragm valve, water is made to flow into said volute chamber in a circumferential direction thereof, said communicating extraction hole is positioned in a vicinity of a center of said volute chamber;
  a volute chamber forming member is provided at an inlet portion of said hole forming member of said diaphragm valve, said volute chamber is formed at a space between a lower portion of said hole forming member of said diaphragm valve and an inner surface portion of said volute chamber forming member, and an inflow port for said volute chamber is formed at a sidewall portion of said volute chamber forming members; and a rib member is formed at an outer peripheral surface of said volute chamber forming member for separating foreign matter from inflowing water, and an inflow port is formed in said rib member and penetrates through said rib member, said inflow port of said rib member communicates with said inflow port of said volute chamber forming member.

11. A diaphragm type water inlet valve comprising an assembly of:

a valve main body having an inlet, an outlet, and a cylindrical chamber which provides communication between said inlet and said outlet;

an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;

a diaphragm valve opposed to a valve seat provided in said cylindrical chamber of said valve main body and held at an outer periphery thereof, said diaphragm valve having a flexible member, and a hole forming member, said flexible member being fixed at its end portion to said valve main body, said hole forming member having a central orifice and communicating extraction hole, a cross sectional are of said central orifice being formed larger than a cross sectional area of said communicating extraction hole, said central orifice being opened and closed by said pilot valve, said diaphragm valve being arranged to form, at a back side thereof, a back pressure chamber separated from a flow passage of a fluid and to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches its lowest position;

a volute chamber is provided at an inlet of said communicating extraction hole of said diaphragm valve, water is made to flow into said volute chamber in a circumferential direction thereof, said communicating extraction hole is positioned in a vicinity of a center of said volute chamber;

a volute chamber forming member is provided at an inlet portion of said hole forming member of said diaphragm valve, said volute chamber is formed at a space between a lower portion of said hole forming member and said diaphragm valve and an inner surface portion of said volute chamber forming member, an inflow port for said volute chamber is formed at a side wall portion of said volute chamber forming member, a rib member is formed integrally with at an outer peripheral surface of said volute chamber forming member for separating foreign matter from inflowing water, and an inflow port is formed in said rib member and penetrates through said rib member, said inflow port of said rib member communicates with said inflow port of said volute chamber forming member.

12. A diaphragm type water inlet valve comprising an assembly of:

a valve main body having an inlet, an outlet, and a cylindrical chamber which provides communication between said inlet and said outlet;

an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;

a diaphragm valve opposed to a valve seat provided in said cylindrical chamber of said valve main body and held at an outer periphery thereof, said diaphragm valve having a flexible member, and a hole forming member, said flexible member being fixed at its end portion to said valve main body, said hole forming member having a central orifice and communicating extraction hole, a cross sectional area of said central orifice being formed larger than a cross sectional area of said communicating extraction hole, said central orifice being opened and closed by said pilot valve, said diaphragm valve being arranged to form, at a back side thereof, a back pressure chamber separated from a flow passage of a fluid and to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches it lowest position;

a volute chamber is provided at an inlet of said communicating extraction hole of said diaphragm valve, water is made to flow into said volute chamber in a circumferential direction thereof, said communicating extraction hole is positioned in a vicinity of a center of said volute chamber; and An outlet chamber forming member for subjecting the water to a large flow resistance is provided at an outlet portion of said communicating extraction hole of said diaphragm valve, and an outlet port of said outlet chamber forming member is formed at a side wall portion of said outlet chamber forming member.

13. A diaphragm type water inlet valve according to claim 12, a rib member is formed at an outer peripheral surface of said volute chamber forming member for separating foreign matter from inflowing water, and an inflow port is formed in said rib member and penetrates through said rib member, said inflow port of said rib member communicates with said inflow port of said volute chamber forming member.

14. A diaphragm type water inlet valve comprising an assembly of:

a valve main body having an inlet, an outlet, and a cylindrical chamber which provides communication between said inlet and said outlet;

an electric control means having an electro-magnetic solenoid, a plunger, a spring member, and a pilot valve, said plunger moving back against a pressure of said spring member when said electro-magnetic solenoid is energized, said pilot valve being provided at a tip end of said plunger;

a diaphragm valve opposed to a valve seat provided in said cylindrical chamber of said valve main body and held at an outer periphery thereof, said diaphragm valve having a flexible member, and a hole forming member, said flexible member being fixed at its end portion to said valve main body, said hole forming member having a central orifice and communicating extraction hole, a cross sectional area of said central orifice being formed larger than a cross sectional area of said communicating extraction hole, said central orifice being opened and closed by said pilot valve, said diaphragm valve being arranged to form, at a back side thereof, a back pressure chamber separated from a flow passage of a fluid and to move upwardly and downwardly under a control of said pilot valve in said back pressure chamber, said communicating extraction hole providing communication between said flow passage and said back pressure chamber, said diaphragm valve being seated on said valve seat to shut off a flow of the fluid when said diaphragm valve reaches it lowest position;

a volute chamber is provided at an inlet of said communicating extraction hole of said diaphragm valve, water is made to flow into said volute chamber in a circumferential direction thereof, said communicating extraction hole is positioned in a vicinity of a center of said volute chamber; and a volute chamber forming member is provided at an inlet portion of said hole forming member of said diaphragm valve, said volute chamber is formed at a space between a lower portion of said hole forming member of said diaphragm valve and an inner surface portion of said volute chamber forming member, an inflow port for said volute chamber is formed at a side wall portion of said volute chamber forming member, a rib member is formed integrally with at an outer peripheral surface of said volute chamber forming member for separating foreign matter from inflowing water, an inflow port is formed in said rib member and penetrates through said rib member, said inflow port of said rib member communicates with said inflow port of said volute chamber forming member, an outlet chamber forming member for subjecting the water to a large flow resistance is provided with an upper projection portion os said hole forming member of said diaphragm valve at an outlet portion of said communicating extraction hole of said diaphragm valve, and an outlet port of said outlet chamber forming member is formed at a side wall portion of said outlet chamber forming member.

* * * * *